April 30, 1946.     C. R. MENDELSON     2,399,371

FISHING TACKLE

Filed May 24, 1943

INVENTOR
CLARENCE R. MENDELSON
BY

*Baldwin Sale*

ATTORNEY.

Patented Apr. 30, 1946

2,399,371

UNITED STATES PATENT OFFICE 2,399,371

FISHING TACKLE

Clarence R. Mendelson, San Francisco, Calif.

Application May 24, 1943, Serial No. 488,286

2 Claims. (Cl. 43—52)

This invention relates to improvements in fishing tackle and more particularly to sinker attaching means.

Among the objects of the invention is the provision of means for attaching the sinker to fishing lines and leaving the line free running movement relative to the sinker.

Another object is to relieve the line of the dead weight of the sinker in playing the fish after a "strike"; preventing the dragging sinker from tearing the hook free from the fish.

Other objects and advantages will appear as the description progresses.

In this specification and the accompanying drawing the invention is disclosed in its preferred form. But it is to be understood that it is not limited to this form; because it may be embodied in modifications within the spirit of the invention as defined in the claims following the description.

Figure 1:
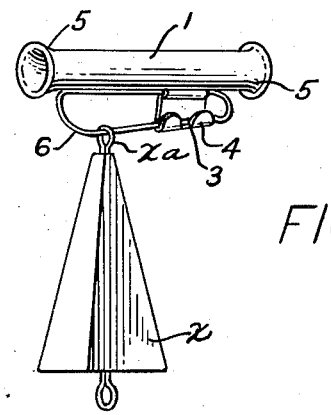
Fig. 1 is a perspective view looking toward the end of a sinker attaching means constructed in accordance with this invention.
Figure 2:
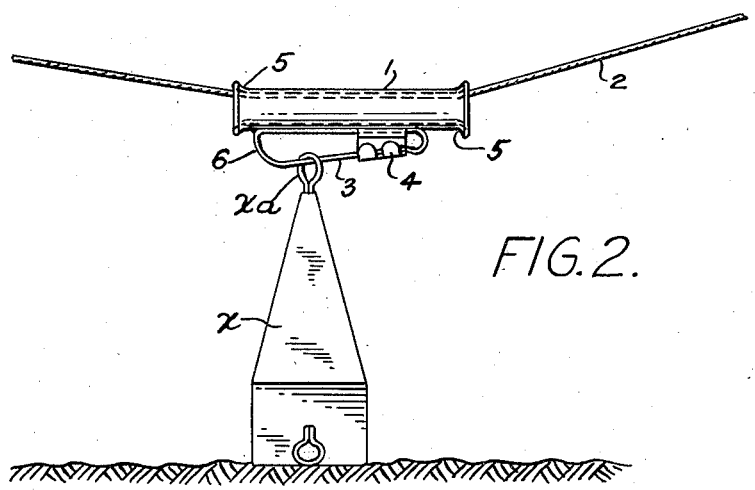
Fig. 2 is a side elevation of the same.

In detail the construction illustrated in the drawing comprises the sleeve 1 through which the line 2 runs freely. The safety catch 3 is fixed to the sleeve and has its free end secured in the keeper 4 that is secured to the fixed end of the catch.

The ends of the sleeve are flared at 5, 5 to reduce the friction on the line as it enters and leaves the sleeve. The keeper 4 is streamlined and the end of the catch terminates within the keeper, to reduce the liability of the sinker attaching means becoming fouled or entangled in vegetable growth and obstructions at the bottom of the water being fished.

The sinker X may be any of the conventional forms having means such as the loop $xa$ for engaging the catch 3. This catch is curved downwardly as at 6, to center the weight of the sinker intermediate the length of the sleeve 1. In addition to the inherent tension of the catch 3, the weight of the sinker also tends to pull the end of the catch more securely within the keeper 4.

The sleeve 1 and the rest of the assembly should be made of noncorrosive material or plated to prevent corrosive reaction with the water, and to insure a smooth running surface within the tubular sleeve. The sleeve could be composed of a suitable plastic material with the catch molded therein, forming an integral assembly.

This invention operates as follows: When the sinker is cast into the water it sinks to and rests upon the bottom. The usual leader composed of sinews, to which the hooks and bait are attached is tied to the end of the line 2. The leader and the bait tend to buoy the end of the line so that it floats above the level of the bottom the desired distance according to the skill of the fisherman or the type of fish to be attracted by the bait.

When a fish takes the bait and is hooked, the line 1 runs freely through the sleeve without lifting the sinker X. When the retarding action is applied to the line by fisherman the hook is firmly embedded in the jaw of the fish and it is played and drawn in in the usual manner. Where the sinker is fixed to the line in a definite location, as in former practice, the inertia of the sinker is sufficient to tear the hook loose from the jaw of a fast moving fish, or permit it to tear the bait loose without being caught by the hook.

For fishing in deep water the sleeve may be made slightly curved to reduce the angle of incidence where the line passes into and out of the sleeve 1. The sinker X may be attached to the sleeve by means other than the catch 3—4—6. The sleeve 1 should be of sufficient length to prevent the line 2 from twisting upon itself above the sinker.

Having thus described this invention, what is claimed and desired to secure by Letters Patent is:

1. A sinker attaching means for a fishing line, comprising a tubular sleeve having outwardly flared ends and freely slidable on said line; a length of wire longitudinally attached to said sleeve and having its end portions looped back upon itself and terminating in juxtaposition; and a flat guard having one of its ends encircling said wire and its opposite end forming an open keeper enclosing said wire ends.

2. A sinker attaching means for a fishing line, comprising a tubular sleeve freely slidable on said line; a length of wire longitudinally attached to said sleeve and having its end portions looped back upon itself and terminating in juxtaposition; a flat guard having one of its ends attached to said wire and its opposite end forming an open keeper enclosing said wire ends; and a pendulous weight having an end eye encircling one of said looped ends.

CLARENCE R. MENDELSON.